United States Patent [19]

Stover

[11] 4,303,525
[45] Dec. 1, 1981

[54] BREWING FUNNEL

[75] Inventor: Kenneth W. Stover, Springfield, Ill.

[73] Assignee: Bunn-O-Matic Corporation, Springfield, Ill.

[21] Appl. No.: 75,601

[22] Filed: Sep. 14, 1979

[51] Int. Cl.³ .......................................... B01D 23/28
[52] U.S. Cl. ................................. 210/455; 210/470; 210/474; 210/464; 99/306
[58] Field of Search ............... 210/473, 474, 477, 481, 210/497 R, 455, 470, 464; 99/304–306, 279–280, 315, 316, 323.3; 222/189, 461, 526; D12/22; D15/113; 141/331, 248; 193/23; D7/62, 68, 47

[56] References Cited

U.S. PATENT DOCUMENTS 3,374,897  3/1968  Martin ............................ 210/474
4,110,221  8/1978  Moser ............................. 210/481
4,174,006  11/1979 Panneman ....................... 99/306
4,207,809  6/1980  Brill ................................ 99/279

Primary Examiner—Benoit Castel
Attorney, Agent, or Firm—Lockwood, Dewey, Alex & Cummings

[57] ABSTRACT

A funnel is disclosed for use in brewing beverages such as coffee, tea and the like and for discharging the beverage into either of a plurality of spaced reservoirs below the funnel. The funnel includes an upstanding side wall, a bottom wall, and flow channel means associated with the bottom wall which communicates between the interior of the funnel and a discharge port spaced from the center of the funnel for selective discharge of liquid into alternate reservoirs by turning the funnel. Stop means provided at a selected radial position on the funnel cooperate with limiting switches or the like on the brewing machine to prevent brewing unless the funnel is in the proper location for discharge into a reservoir.

3 Claims, 7 Drawing Figures

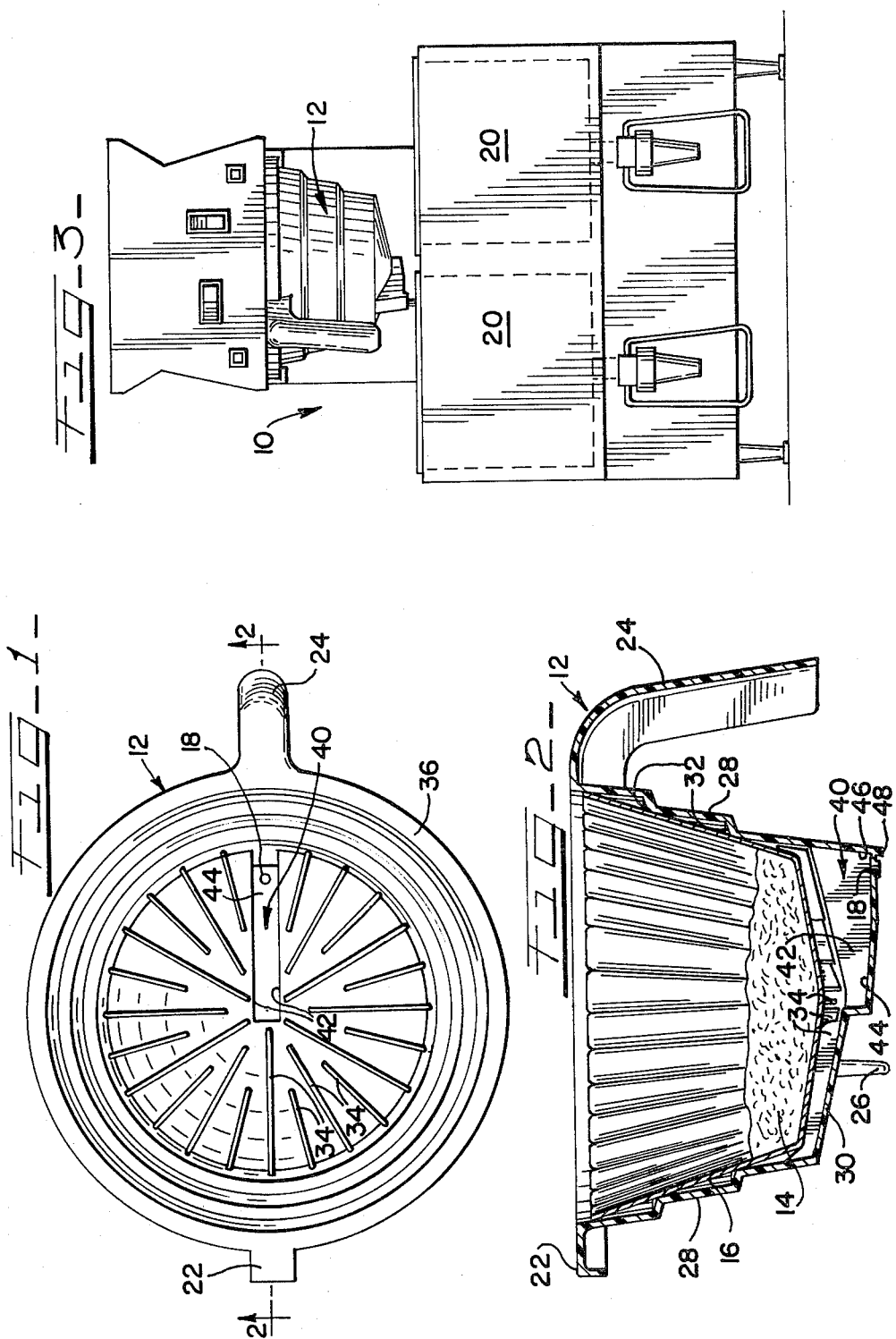

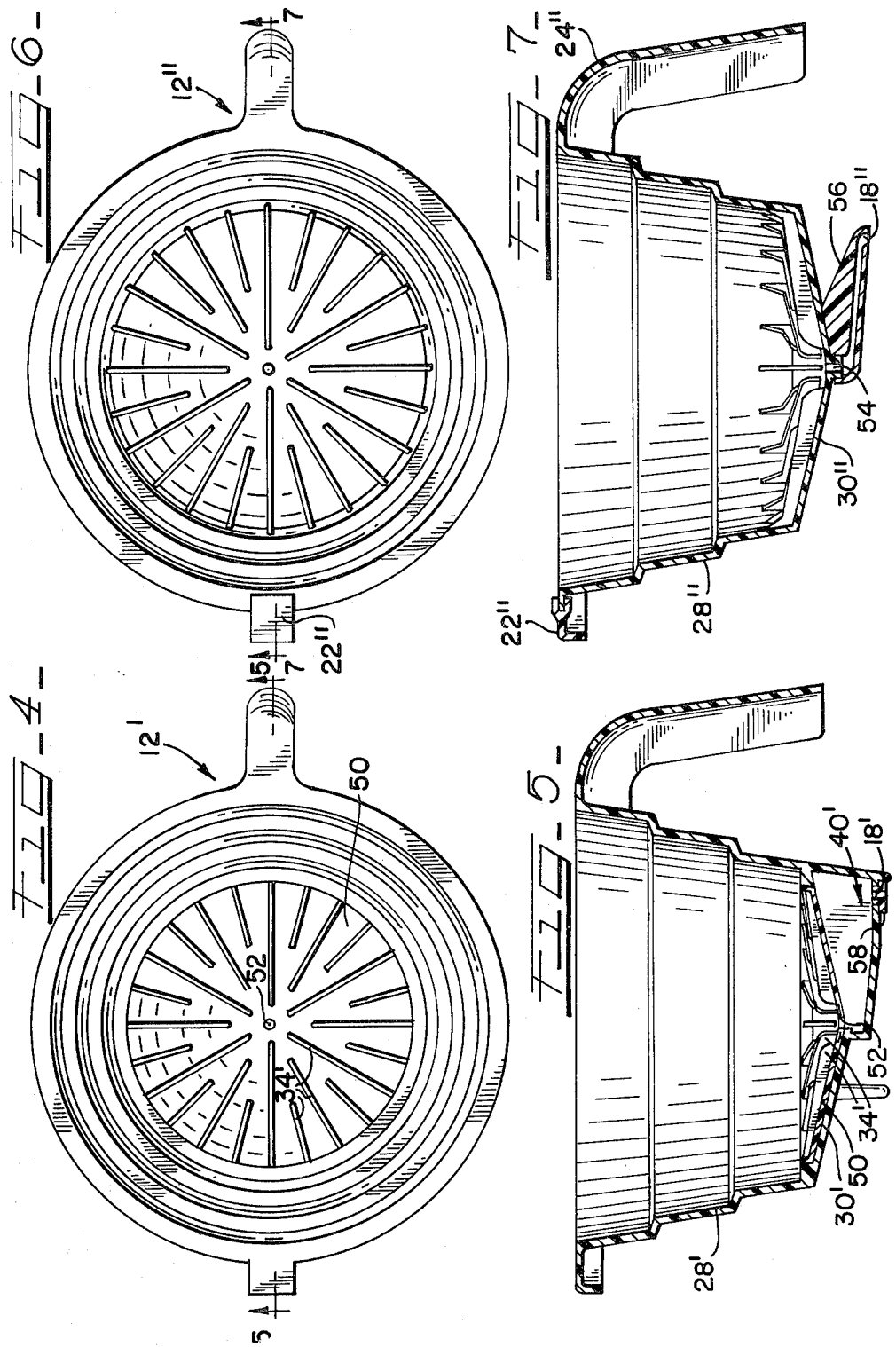

BREWING FUNNEL

The present invention generally relates to apparatus for brewing beverages such as coffee or tea. More particularly it relates to a funnel for holding a particulate product such as coffee and tea on a filter from which the beverage may be brewed by passing heated brewing water therethrough.

In the high volume restaurant business, it is often necessary to brew large quantities of coffee and tea. Typical brewing equipment has employed a single brewing station with a funnel that holds a filter containing coffee or tea grounds through which heated water is passed. To brew a second pot or carafe of the beverage, the first carafe must be removed to a separate heater or the like and a new carafe positioned in place for another brewing cycle. A typical brewing funnel used in such machines is shown in U.S. Pat. No. 3,374,897 to Martin. It has a center discharge port or orifice for discharging the brewed liquid into the single carafe below the funnel.

It is an object of the present invention to provide a brewing funnel which permits the brewing process to be made more efficient, and the brewing liquid to be discharged into one or the other of two adjacent carafes, containers, or reservoirs.

It is another object of the present invention to provide such a beverage funnel which includes means for preventing the brewing cycle from occuring unless the funnel is in the proper position.

It is a further object of the present invention to provide a brewing funnel which may be used for making different beverages as well as with water of varying degrees of hardness.

It is a still further object of the present invention to provide a funnel which may rest on a flat work surface or countertop without contaminating the funnel discharge port.

These and other objects of the present invention are set forth in the following detailed description and the attached drawings, of which:

FIG. 1 is a top plan view of a beverage funnel embodying the present invention.

FIG. 2 is a vertical sectional view of the filter of FIG. 1, taken along a line 2—2 of FIG. 1 and including a filter and granulated beverage product therewithin.

FIG. 3 is a front elevation of a beverage making machine which employs a funnel in accordance with the present invention.

FIG. 4 is a top plan view of an alternative embodiment of the funnel of the present invention.

FIG. 5 is a vertical sectional view taken along line 5—5 of FIG. 4.

FIG. 6 is a top plan view of a still further embodiment of a funnel in accordance with the present invention.

FIG. 7 is a vertical sectional view taken along line 7—7 of FIG. 6.

The present invention is generally embodied in a beverage making apparatus 10 for brewing beverages by passing hot water through a funnel 12 that contains a particulate product, such as coffee or tea 14 retained on or in a disposable filter 16. In accordance with the present invention, the funnel 10 has an off-center discharge port or orifice 18, which may be formed integrally with the funnel as in FIG. 2 or provided by a separate add-on spout as in FIG. 7, that permits selective discharge into either of a pair of adjacent reservoirs 20 in the brewing machine 10 by merely rotating the funnel, over the desired reservoir. To prevent spillage, a radially extending stop 22 may be provided on the funnel, preferably diametrically opposite the handle 24, for engaging and actuating a switch and/or a stop on the machine to prevent operation of the brewing machine except when the discharge port 18 is located over a reservoir 20. Sanitation is also enhanced by legs 26 which support the funnel, including the discharge port 18, above the countertop or work surface upon which it rests when the filter or grounds are being replaced.

Turning now to a more detailed description of the preferred embodiment of the present invention which is shown in FIGS. 1-3 for the purpose of illustration and not limitation, the funnel 12 embodying the present invention is generally frusto-conically shaped with a stepped upstanding side wall portion 28 and a bottom wall 30 which is slightly inclined toward the center of the funnel for discharging liquid. The funnel is preferably on one piece plastic construction, and may be made of any plastic that can withstand the elevated temperatures used in brewing coffee, tea or the like and which does not effect the taste of the product. In addition, the funnel may be made of any suitable metal, e.g., stainless steel, or a combination of metal and plastic.

Although prepackaged coffee, tea or the like may be used, the funnel is intended to receive the fluted and correspondingly shaped paper filter 16, into which the tea or coffee is placed. This is typical of currently available coffee makers.

The upstanding side wall 28 of the funnel has a pair of generally radially extending steps 32, forming a pair of shoulders to abut the paper filter to prevent it from adhering too closely to the side of the funnel. As best seen in FIG. 1, the bottom wall 30 of the funnel includes a plurality of radially extending, upstanding ribs 34 which support the filter above the bottom wall. The ribs are of varying length to provide more rib support at the larger outer perimeter of the bottom wall than at the center. Liquid flowing through the food product 14 and the filter 16 flows down the inclined bottom wall 30 between the ribs 34 to the center of the funnel.

The funnel 12 has a generally radially extending brim 36 around the top edge for receipt in a pair of facing slots in the brewing machine 10. For ease of handling, the plastic handle 24 is generally molded as part of the funnel, as are the downwardly extending legs 26 from the bottom wall which support the funnel above flat work surfaces or countertops.

To discharge the beverage into either of the selected reservoirs 20, flow channel means in the form of a recessed channel 40 is molded into the bottom wall 30 of the funnel 12. This recess or channel is integral with the bottom wall 30 and extends generally radially from the center portion of the bottom wall outwardly to adjacent the funnel side wall 28. Although the recess may be of any selected shape, it is of generally rectangular cross-section in the preferred embodiment with a pair of planar side walls 42, depending from the bottom wall and a lower wall 44 which slopes downwardly toward the discharge port 18 which is adjacent to the end wall 46 of the recess. The end wall 46 is integral and in-line with the side wall 28 of the funnel and has a short extension or foot 48 that extends below the discharge port 18 to cooperate with the legs 26 so that when the funnel is set on a work surface, the discharge port does not rest on the surface and is not contaminated by dust or the like which may be on the surface. With the discharge port spaced laterally or off-center, the funnel may be rotated from one side to the other to permit discharge of the brewing beverage into either of the selected reservoirs 20.

The stop 22 is preferably molded integrally with the funnel to abut a brew control switch and/or stop on the machine 10 to prevent operation of the machine unless the funnel is correctly positioned over one or the other reservoir. The stop 22 is preferably diametrically opposite the handle 24, and the flow channel 40 in the bottom wall 30 of the funnel preferably extends radially toward the handle, so that when the handle is positioned over one or the other containers, the discharge port will also be located over that reservoir, and the stop will be engaging the switch which controls operation of the machine. This permits both visual and automatic (via switch) verification of the correct positioning of the funnel. When a positive stop is used on the brewing machine in combination with the switch, the funnel may be properly positioned by simply turning it until the radial stop 22 on the funnel abuts the stop in the machine. Thus, visual check of the position of the brew funnel is not required.

FIGS. 4 and 5 illustrate an alternative embodiment of the present invention, there the funnel 12' is similarly of frusto-conical shape with side walls 28' and bottom wall 30' with a channel 40' molded integrally with the bottom wall for discharging the fluid. In accordance with this embodiment, the upstanding ribs 34' are formed on a separate disc-shaped insert member 50 which is secured, e.g., by solvent or adhesive, to the bottom wall of the funnel. A center opening 52 in the insert 50 permits beverage to flow into the flow channel 40' for discharge into the reservoirs 20.

The embodiment shown in FIG. 6 is yet another alternative employing the present invention. There, and a funnel 12" having side wall 28", bottom wall 30" and handle 24" is molded of integral one piece construction with a center discharge port 54 in the bottom wall. A separate stop 22" is shown attached, as by adhesive of snap-on engagement to the rim of the funnel. Such a funnel may be adapted for such a use in a machine such as illustrated in 10" by attaching a separate discharge member 56 to the bottom wall 30" to conduct brewing liquid radially outwardly to the discharge port 18" that is laterally spaced from the center of the funnel. This would permit center-discharge funnels that are currently in use to be adapted for use in the machine 10. Although they may not have the safety feature of a stop 22 to engage safety switches on the machine, this item also could be added to the funnel just as the member 56 is.

Because a brewing machine 10 may be used in locations where the water hardness varies or may be used for brewing different beverages, such as coffee or tea, in accordance with another aspect of this invention, the orifice or discharge port 18 may be variable to control the flow of liquid as necessary to prepare the best beverage. For example, tea often requires more steeping to extract the full flavor than does coffee. Accordingly, the orifice 18, defined by a removable insert 58 could be made smaller by removing the insert and inserting another which has a smaller orifice. A supply of different orifices would be available to be used with the desired beverage or to be changed depending on water conditions. The insert could be mounted with simple frictional insert-type engagement or with a twist-lock feature.

Although the present invention has been set forth in terms of the preferred embodiment, the invention as defined in the following claims, is intended to include those equivalent structures, some of which may be apparent upon reading of this application and others of which may become apparent only after some study.

What is claimed is:

1. A one-piece brewing funnel for beverages, comprising:

a continuous upstanding side wall, a bottom wall and means for supporting a disposable filter above said bottom wall;

said bottom wall comprising a depending wall portion extending radially from the center of said bottom wall to substantially adjacent said side wall and defining a beverage flow channel along the inside surface of said bottom wall communicating with the interior of said funnel, said depending wall portion including a discharge orifice spaced from said center to permit discharge of beverage at selected variable positions by rotation of said funnel;

a handle carried by said side wall, said handle being positioned on the same side of the funnel as said orifice and generally radially aligned with said orifice; and a generally radially-extending, position-limiting stop member carried on said side wall at a position diametrically opposite said handle.

2. A funnel in accordance with claim 1 wherein said flow channel is downwardly inclined toward said orifice.

3. A funnel in accordance with claim 1 further comprising a pair of support legs depending from said bottom wall, said support legs being spaced to form a tripod support means with said depending wall portion for level support of said funnel on a flat surface, said orifice being located above the lowermost portion of said depending wall portion to prevent contact with a flat surface when the funnel is rested thereon.

* * * * *